(12) United States Patent
Rabois

(10) Patent No.: US 10,829,969 B2
(45) Date of Patent: Nov. 10, 2020

(54) DEVICE FOR LOCKING A MOVING ELEMENT SUCH AS AN AIRCRAFT DOOR AND AIRCRAFT EQUIPPED WITH SAID LOCKING DEVICE

(71) Applicant: AIRBUS SAS, Blagnac (FR)

(72) Inventor: Serge Rabois, Dremil Lafage (FR)

(73) Assignee: AIRBUS SAS, Blagnac (FR)

( * ) Notice: Subject to any disclaimer, the term of this patent is extended or adjusted under 35 U.S.C. 154(b) by 1081 days.

(21) Appl. No.: 15/276,032

(22) Filed: Sep. 26, 2016

(65) Prior Publication Data

US 2017/0089106 A1  Mar. 30, 2017

(30) Foreign Application Priority Data

Sep. 25, 2015 (FR) ...................... 15 59034

(51) Int. Cl.
*E05C 19/00* (2006.01)
*B64C 1/14* (2006.01)
(Continued)

(52) U.S. Cl.
CPC .......... *E05C 19/002* (2013.01); *B64C 1/1407* (2013.01); *B64C 1/1415* (2013.01);
(Continued)

(58) Field of Classification Search
CPC .......... E05C 9/006; E05C 9/08; E05C 9/1875; E05C 9/1883; E05C 9/1891; E05C 19/002; E05C 19/003; E05C 19/007; E05C 19/10; E05C 21/00; E05C 3/12; E05C 19/12; E05B 15/0053; E05B 15/006; E05B 15/022;
(Continued)

(56) References Cited

U.S. PATENT DOCUMENTS

| 826,343 A | * | 7/1906 | Mason | ................ E05B 83/243 292/129 |
| 1,274,758 A | * | 8/1918 | Page | ................ E05B 63/127 70/114 |

(Continued)

FOREIGN PATENT DOCUMENTS

| DE | 19825405 | 6/1999 |
| DE | 102012017385 A1 * | 3/2014 ........... B62D 33/071 |

(Continued)

OTHER PUBLICATIONS

French Search Report, dated May 11, 2016, priority document.

*Primary Examiner* — Christine M Mills
(74) *Attorney, Agent, or Firm* — Greer, Burns & Crain, Ltd.

(57) ABSTRACT

A locking device which includes a hook and a dual control for locking the hook. The dual control includes a first shaft and a second shaft. The first shaft incorporates a section and is rotationally mobile between a hooked position, in which the section is accommodated in a housing of the hook and an unhooked position, in which the section is outside the housing of the hook. The second shaft incorporates a section and is rotationally mobile between a locked position, in which the section of the second shaft is accommodated in a notch in a flange of the first shaft and an unlocked position, in which the section of the second shaft is outside the notch in the flange of the first shaft.

10 Claims, 4 Drawing Sheets

(51) Int. Cl.
*B64D 29/06* (2006.01)
*E05C 3/12* (2006.01)
*E05C 9/08* (2006.01)
*E05C 9/18* (2006.01)
*E05C 19/12* (2006.01)

(52) U.S. Cl.
CPC ............... *B64D 29/06* (2013.01); *E05C 3/12* (2013.01); *E05C 9/08* (2013.01); *E05C 9/1808* (2013.01); *E05C 19/12* (2013.01)

(58) Field of Classification Search
CPC ............ E05B 17/2088; E05B 17/208; E05B 17/2053; E05B 17/2034; E05B 17/2015; E05B 17/2011; E05B 17/2007; B64C 1/1415; B64C 1/1407; Y10S 292/41; Y10S 292/53; Y10S 292/64; Y10T 292/0953; Y10T 292/0959; Y10T 292/1085; Y10T 292/1092; Y10T 292/0825; Y10T 292/0826; Y10T 292/0911; Y10T 292/0921; Y10T 292/0922; Y10T 292/081; Y10T 292/0811; Y10T 292/0945; Y10T 292/1044; Y10T 292/1045; Y10T 292/297; Y10T 292/696; Y10T 292/702; Y10T 292/0862; Y10T 292/23; Y10T 292/285; Y10T 292/288; Y10T 292/296; Y10T 292/1047; Y10T 292/1031; B64D 29/06

USPC ... 292/24, 25, 95, 116, 117, 11, 12, 96, 103, 292/108, 213, 214, 204, 210, 271, 341.15, 292/341.17, 56, 259 R, DIG. 41, DIG. 53, 292/DIG. 64, 153, 216; 244/129.4, 129.5, 244/132
See application file for complete search history.

(56) References Cited

U.S. PATENT DOCUMENTS

| | | | | |
|---|---|---|---|---|
| 1,685,079 | A * | 9/1928 | Abel | B61D 3/08 105/310.1 |
| 4,039,163 | A * | 8/1977 | Shorey | B64C 1/22 244/137.1 |
| 4,288,117 | A * | 9/1981 | Nardi | E05B 85/24 292/52 |
| 4,570,816 | A * | 2/1986 | Ferris | B65D 90/10 105/308.2 |
| 8,827,325 | B2 * | 9/2014 | Risch | B64C 1/1415 292/150 |
| 9,903,137 | B2 * | 2/2018 | Min | E05B 49/00 |
| 10,538,304 | B2 * | 1/2020 | Erben | E05C 19/12 |
| 2010/0219647 | A1 | 9/2010 | Risch | |
| 2015/0298793 | A1 * | 10/2015 | Fox | B64C 3/56 244/49 |

FOREIGN PATENT DOCUMENTS

| | | | |
|---|---|---|---|
| GB | 102315 A * | 11/1916 | ............... E05C 1/02 |
| WO | 2009059808 | 5/2009 | |

* cited by examiner

DEVICE FOR LOCKING A MOVING ELEMENT SUCH AS AN AIRCRAFT DOOR AND AIRCRAFT EQUIPPED WITH SAID LOCKING DEVICE

CROSS-REFERENCES TO RELATED APPLICATIONS

This application claims the benefit of the French patent application No. 1559034 filed on Sep. 25, 2015, the entire disclosures of which are incorporated herein by way of reference.

BACKGROUND OF THE INVENTION

This invention relates to a device for locking a moving element such as an aircraft door and to an aircraft equipped with said locking device.

FIG. 1 shows an opening 10 in a fuselage 12 of an aircraft, FIG. 3 shows part of a door 14 configured for occluding the opening 10, and FIGS. 2, 3, 4A to 4C show a locking mechanism allowing the door 14 to be held in the closed position.

According to an embodiment of the prior art, the locking mechanism includes a keeper 16 integral with the fuselage 12 and a hook 18 integral with the door 14.

The keeper 16 is fixed and includes a cylinder 20, which has an axis oriented along a longitudinal direction and a clevis 22, which is integral with the fuselage and which supports the cylinder 20.

As illustrated on FIGS. 4A to 4C, the hook 18 is rotationally mobile around a first shaft 24 whose axis is parallel to the longitudinal direction, said hook 18 being mobile between a hooked state (visible on FIGS. 4B and 4C), in which the hook 18 cooperates with the keeper 16 so as to hold the door 14 in the closed position and an unhooked state (visible on FIG. 4A) in which the hook 18 is distanced from the keeper 16 in order to allow the door 14 to open.

According to an embodiment visible on FIGS. 4A to 4C, the locking mechanism also includes a control system 26 configured for making the hook 18 pivot and for holding it in the hooked state, said control system 26 being mounted on a support 28 fastened to the door 14.

This control system 26 includes:

a first control 30 integral with a blocking shaft 32 mounted to pivot on the support 28 and oriented along the longitudinal direction, a first link 34, which is placed in a plane perpendicular to the longitudinal direction, a first extremity 34.1 of the first link 34 being connected to the hook 18 and a second extremity 34.2 of the first link 34 being connected to the first control 30, a second control 36 integral with a locking shaft 38 mounted to pivot on the support 28 and oriented along the longitudinal direction, and a second link 40, which is placed in a plane perpendicular to the longitudinal direction, a first extremity 40.1 of the second link 40 being connected to the first control 30, the second extremity 40.2 of the second link 40 being connected to the second control 36.

The control system 26 includes actuators for controlling the rotational movement of the blocking and locking shafts 32, 38.

The shafts 24, 32, 38 and the links 34 and 40 are arranged so as to form a toggle joint mechanism. The hook 18 therefore successively occupies an unhooked state visible on FIG. 4A, a hooked unlocked state visible on FIG. 4B and a hooked and locked state visible on FIG. 4C.

On account of its design, a locking device according to the prior art is relatively complex due to the large number of parts and has a relatively high weight when the hook 18 has large dimensions to the extent that the control system 26 and the support 28 are dimensioned notably on the basis of the dimensions of the hook 18. These disadvantages are all the more detrimental in the case of a door of an aircraft hold since the door includes several locking mechanisms, each including a hook with large dimensions.

SUMMARY OF THE INVENTION

This application therefore aims to remedy the disadvantages of the prior art.

To that effect, an object of the invention is a device for locking a first mobile element of an aircraft in relation to a second fixed element, the locking device including a first part integral with one of the two elements among the mobile element and the fixed element, and a second part integral with the other element, the first part including a hook with a housing.

According to the invention, the locking device is characterized in that the second part includes:

a first shaft, which incorporates a flange with a notch and a section configured for cooperating with the housing of the hook, the first shaft being rotationally mobile between a hooked position, in which the section is accommodated in the housing of the hook and an unhooked position in which the section is outside the housing of the hook, and a second shaft, which incorporates a section configured for cooperating with the notch in the flange, said second shaft being rotationally mobile between a locked position, in which the section of the second shaft is accommodated in the notch in the flange of the first shaft such that the rotation of the first shaft is immobilized, and an unlocked position, in which the section of the second shaft is outside the notch in the flange of the first shaft such that the first shaft is free to rotate.

The invention makes it possible to obtain a locking device with a dual control based on pivoting elements (the first and second shafts), without links. This design makes it possible to reduce the number of parts and consequently to simplify the locking device and to reduce its weight.

According to another advantage, the fact of using only pivoting elements and of doing away with the links makes it possible to obtain a more compact assembly and to limit the risks of malfunctioning in the event of icing.

According to another advantage, since the dual control formed by the first and second shafts is no longer connected to the hook, its dimensioning is independent of that of the hook. This contributes to reducing the weight of the locking device.

Finally, the locking device is compatible, subject to minor adjustments, with the actuators of the locking devices of the prior art.

The second part preferably includes a clevis, which incorporates a base, and the hook includes an extremity with a height smaller than the distance between the base of the clevis and the section of the first shaft when said first shaft is in the unhooked position, and greater than the distance between the base of the clevis and the section of the first shaft when said first shaft is in the hooked position.

Advantageously, the hook has a minimum height equal to the distance between the base and the section of the first shaft when said first shaft is in the hooked position.

According to one embodiment, the section of the first shaft is a half disc and the hook includes a peripheral edge, which incorporates a profile with a radius equal to the radius of the section of the first shaft, said profile delimiting the housing of the hook.

The base of the clevis preferably includes a side, which is oriented towards the first shaft and which includes at least one shim for adjusting the distance between the base and the section of the first shaft.

According to another characteristic, the flange includes, at the periphery, a first cylindrical portion and a second cylindrical portion, the second cylindrical portion having a diameter greater than that of the first cylindrical portion, the first cylindrical portion and the second cylindrical portion being separated by the notch and a radial stop.

According to one embodiment, the notch and the radial stop are diametrically opposite.

According to another characteristic, the first part of the locking device includes a third shaft with an axis parallel to the axes of the first and second shafts, said third shaft being accommodated in a bore of the hook such that said hook pivots around the axis of the third shaft.

Advantageously, the third shaft has a diameter smaller than the diameter of the bore of the hook and the first part of the locking device includes a ring with an eccentric bore interposed between the third shaft and the bore of the hook.

Another object of the invention is an aircraft, which includes an opening closed by a door, the opening and the door being equipped with a locking device according to the invention.

BRIEF DESCRIPTION OF THE DRAWINGS

Other characteristics and advantages will emerge from the description of the invention that will follow, description given only as an example, with reference to the attached drawings, on which.

DETAILED DESCRIPTION OF THE PREFERRED EMBODIMENTS

Figure 1:
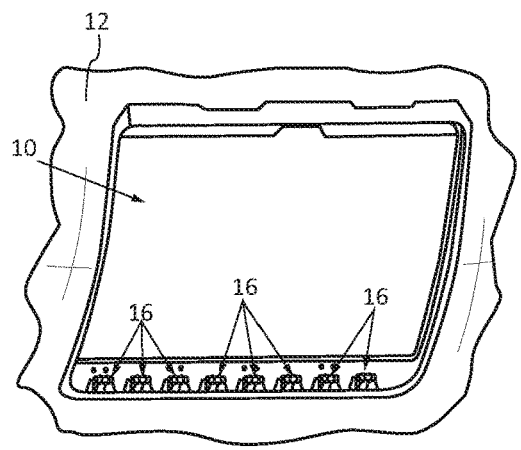
FIG. 1 is a perspective view of an opening made in an aircraft fuselage, which illustrates an embodiment of the prior art.
Figure 2:
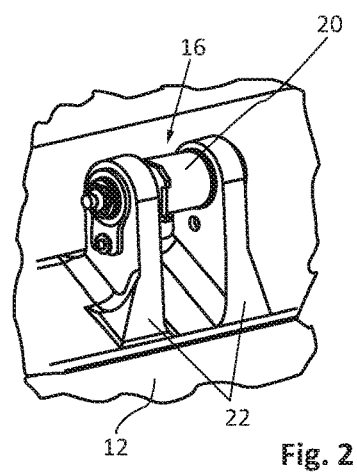
FIG. 2 is a perspective view of a part of the edge of the opening, which illustrates in detail an embodiment of a keeper of a locking device of the prior art.
Figure 3:
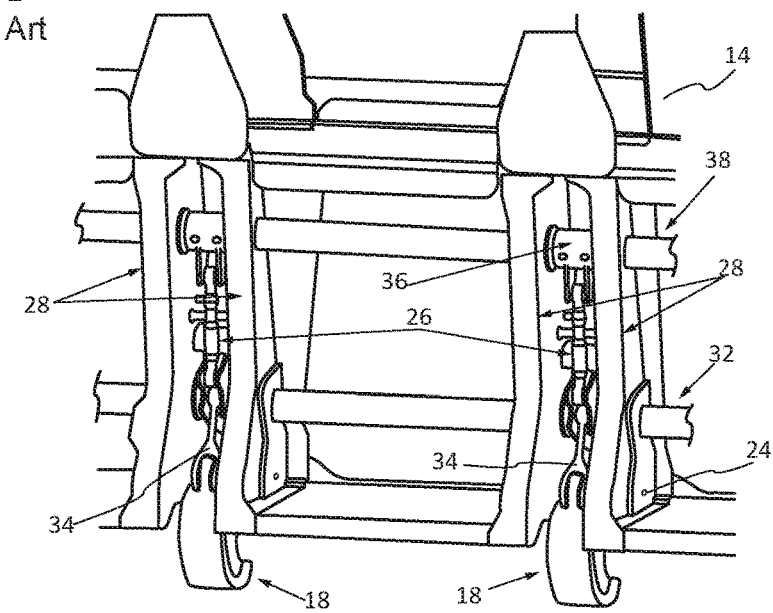
FIG. 3 is a perspective view of a part of an aircraft door, which illustrates an embodiment of a hook and of a control system of a locking device of the prior art.
Figure 4A:
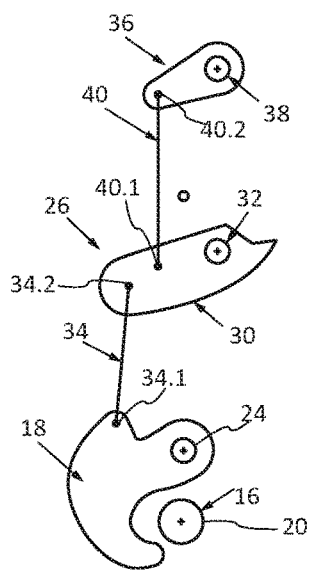
FIGS. 4A to 4C are diagrams, which illustrate the functioning of a locking device of the prior art.
Figure 4B:
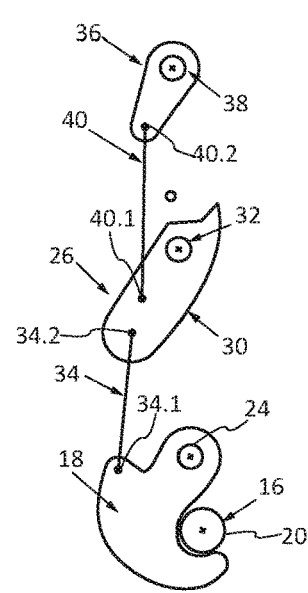
Figure 4C:
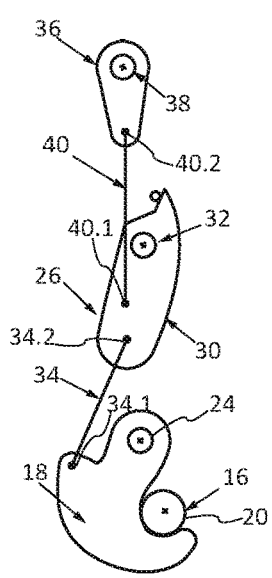
Figure 5:
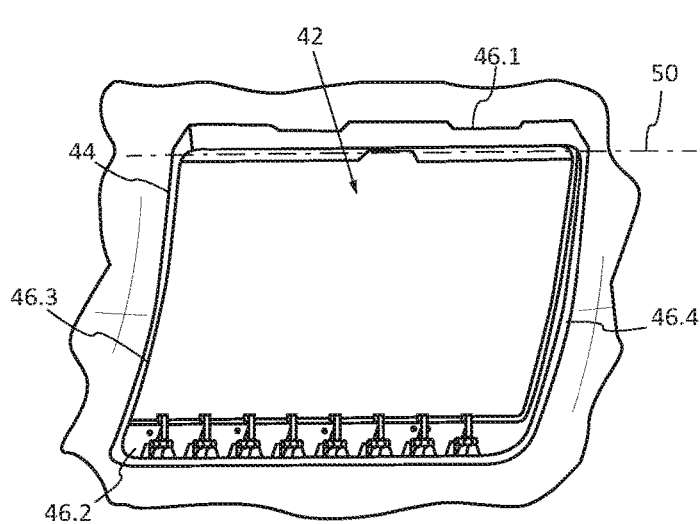
FIG. 5 is a perspective view of an opening in an aircraft equipped with locking devices, which illustrates the invention.

FIG. 5 shows an opening 42 in a fuselage 44 of an aircraft. As an example, this opening 42 is configured for allowing access to a hold of an aircraft.

This opening 42 is substantially rectangular with rounded corners and is delimited by a first edge 46.1, a second edge 46.2 parallel to the first edge 46.1, a third edge 46.3 and a fourth edge 46.4 parallel to the third edge 46.3.

Figure 6:
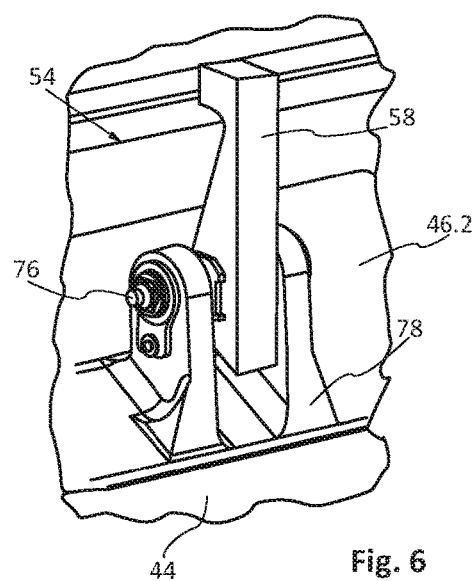
FIG. 6 is a perspective view of a hook of a locking device fastened at the edge of the opening of FIG. 5, which illustrates in detail an embodiment of the invention.

FIG. 6 shows a part of a door 48 configured for occluding the opening 42 in the closed position.

According to one embodiment, the door 48 is connected to the first edge 46.1 of the opening by a pivoting link materialized by an axis 50 on FIG. 5.

The aircraft includes at least one locking device 52 for holding the door 48 in the closed position. As illustrated on FIG. 5, in the case of a door of an aircraft hold, a plurality of locking devices (eight devices in the example shown) are provided.

Figure 7:
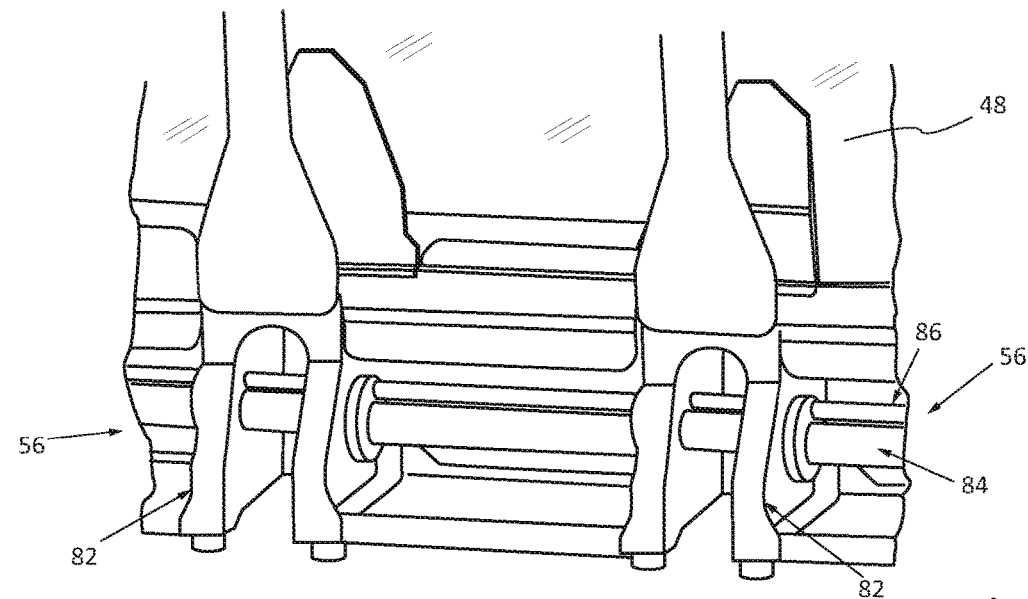
FIG. 7 is a perspective view of a part of an aircraft door equipped with locking devices, which illustrates the invention.

Each locking device 52 includes a first part 54 integral with the fuselage 44 (visible on FIG. 6) and a second part 56 integral with the door 48 (visible on FIG. 7).

The first part 54 includes a hook 58.

According to one embodiment, the hook 58 is delimited by two sides 60.1 and 60.2 (referenced on FIG. 8), parallel and placed in transverse planes, and a peripheral edge 62 (notably visible on FIGS. 9A and 14), which extends between the two sides 60.1 and 60.2, perpendicular to said sides 60.1 and 60.2.

For the further description, a longitudinal direction is a direction perpendicular to the sides 60.1 and 60.2 of the hook. A transverse plane is a plane perpendicular to the longitudinal direction. A shaft is a revolving part and an axis corresponds to an imaginary line around which a part pivots.

The axis 50 of the pivoting link between the door and the fuselage is preferably oriented parallel to the longitudinal direction.

Figure 14:
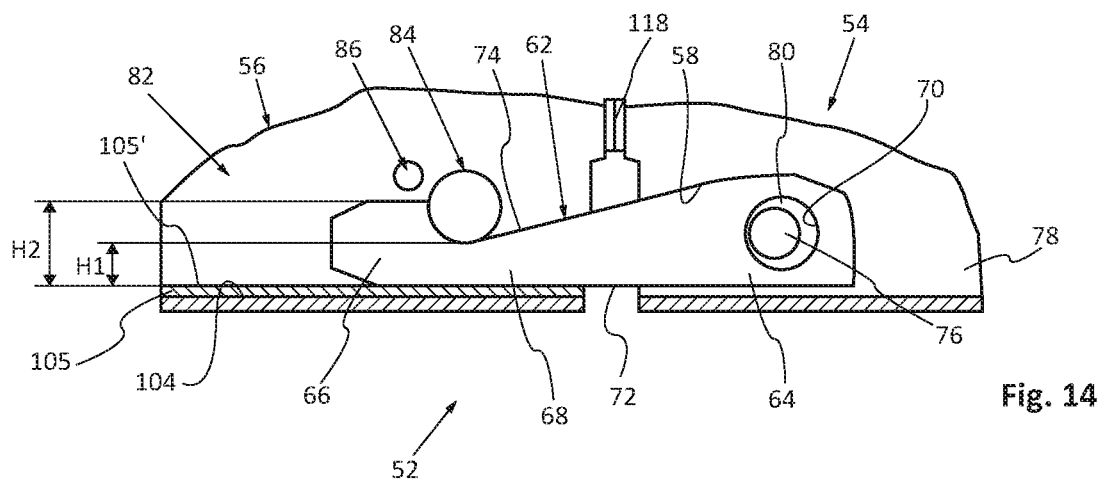
FIG. 14 is a side view of a locking device, which illustrates an embodiment of the hook.

As illustrated on FIG. 14, the hook 58 includes a body 64, an extremity 66 and an interposed portion 68 positioned between the body 64 and the extremity 66. The interposed portion 68 has a minimum height H1 smaller than a height H2 of the extremity 66. A height corresponds to the dimension of the hook in a transverse plane.

The body 64 includes a bore 70, which opens in the two sides 60.1 and 60.2.

According to one configuration, the peripheral edge 62 includes a first flat part 72, which extends from the body 64 up to the extremity 66 and a second curved and concave part 74, which also extends from the body 64 up to the extremity 66. This second part 74 delimits a housing 75, notably visible on FIG. 9A.

Figure 8:
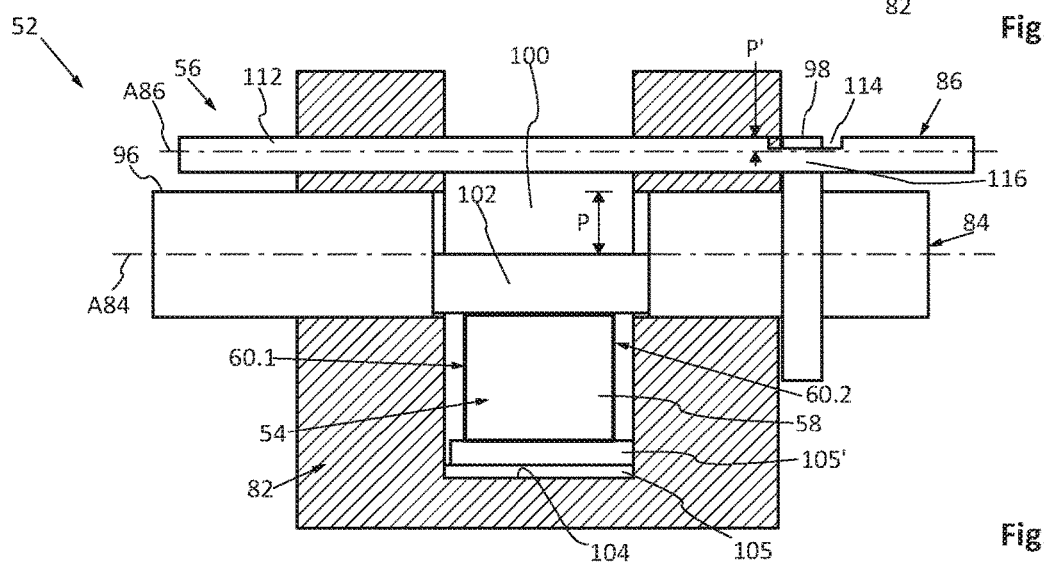
FIG. 8 is a diagram in a longitudinal plane of a locking device, which illustrates the invention.

According to an embodiment visible on FIG. 8 for example, the second part 56 of the locking device includes a clevis 82, a first shaft 84 configured for immobilizing the hook 58 and a second shaft 86 configured for immobilizing the rotation of the first shaft 84. The first and second shafts 84 and 86 are supported by the clevis 82. The first and second shafts 84 and 86 have axes A84 and A86 parallel to each other and parallel to the longitudinal direction.

Figure 11:
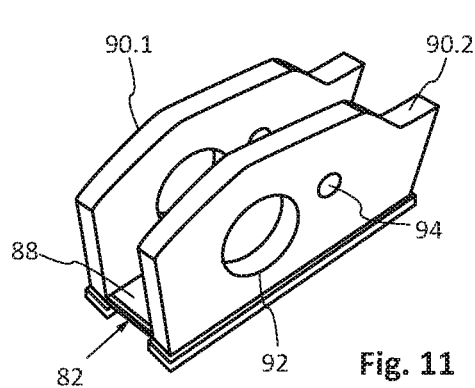
FIG. 11 is a perspective view of a clevis of a locking device, which illustrates an embodiment of the invention.

According to an embodiment visible on FIG. 11, the clevis 82 includes a base 88 and two flanks 90.1 and 90.2 parallel to each other and positioned in transverse planes. The two flanks 90.1 and 90.2 are spaced by a distance greater than the thickness of the hook 58 in order to allow it to penetrate between the two flanks 90.1 and 90.2. The thickness of the hook 58 corresponds to a dimension of the hook 58 taken along the longitudinal direction.

Each flank 90.1 and 90.2 includes a first bore 92, which forms a bearing for the first shaft 84 and a second bore 94, which forms a bearing for the second shaft 86.

Figure 12:
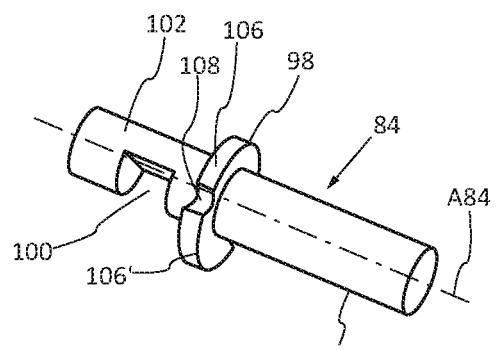
FIG. 12 is a perspective view of a first shaft of a locking device, which illustrates an embodiment of the invention.

According to an embodiment visible on FIG. 12, the first shaft 84 includes a cylindrical body 96, which has a diameter equal to that of the first bores 92 of the flanks 90.1 and 90.2, a flange 98, which has a diameter greater than that of the body 96 and which extends in a plane perpendicular to the longitudinal direction and a flat indent 100.

The flat indent 100 has a length greater than or equal to the thickness of the hook 58. The flat indent preferably has a length substantially equal to the distance which separates the two flanks 90.1 and 90.2. The flat indent 100 preferably has a depth P (visible on FIG. 8) substantially equal to the radius of the body 96. At the flat indent 100, the body 96 therefore has a residual section 102 in the shape of a half disk.

The flat indent 100 is separated from the flange 98 by a distance substantially equal to the thickness of the flank 90.1 or 90.2 against which the flange 98 is pressed during functioning The first shaft 84 is mounted to pivot in the first bores 92 of the flanks 90.1 and 90.2 and alternately occupies, depending on its angular position, an unhooked position in which the flat indent 100 is oriented towards the base 88 of the clevis 82 and a hooked position in which the residual section 102 of the first shaft 84 is oriented towards the base 88 of the clevis 82.

The first shaft 84 is separated from the base 88 of the clevis 82 by a distance such that:

in the unhooked position, the height H2 of the extremity 66 of the hook 58 is smaller than the distance between the base 88 of the clevis 82 and the residual section 102 of the first shaft 84, and in the hooked position, the height H2 of the extremity 66 of the hook 58 is greater than the distance between the base 88 of the clevis 82 and the residual section 102 of the first shaft 84.

In the hooked position, the minimum height H1 of the interposed portion 68 of the hook 58 is preferably substantially equal to the distance between the base 88 and the residual section 102 of the first shaft 84. This configuration makes it possible to limit deflections of the hook 58 in the hooked position. According to one embodiment, the second curved and concave part 74 of the peripheral edge 62 of the hook 58 includes a cylindrical profile with a radius equal to that of the body 96 of the first shaft 84.

As illustrated on FIG. 14, the base 88 of the clevis 82 includes a side 104 oriented towards the first shaft 84. This side 104 advantageously includes at least one shim 105 for adjusting the distance between the base 88 and the first shaft 84 to the minimum height H1 of the interposed portion 68 of the hook 58.

This side 104 of the base 88 preferably includes a lining 105', for example a wear covering, applied directly to the side 104 in the absence of the shim 105, or to the shim 105.

The flange 98 of the first shaft 84 includes, at the periphery, at least one cylindrical portion 106 and at least one notch 108. The flange 98 preferably includes a single notch 108, which corresponds to the hooked position.

Figures 9A, 9B:
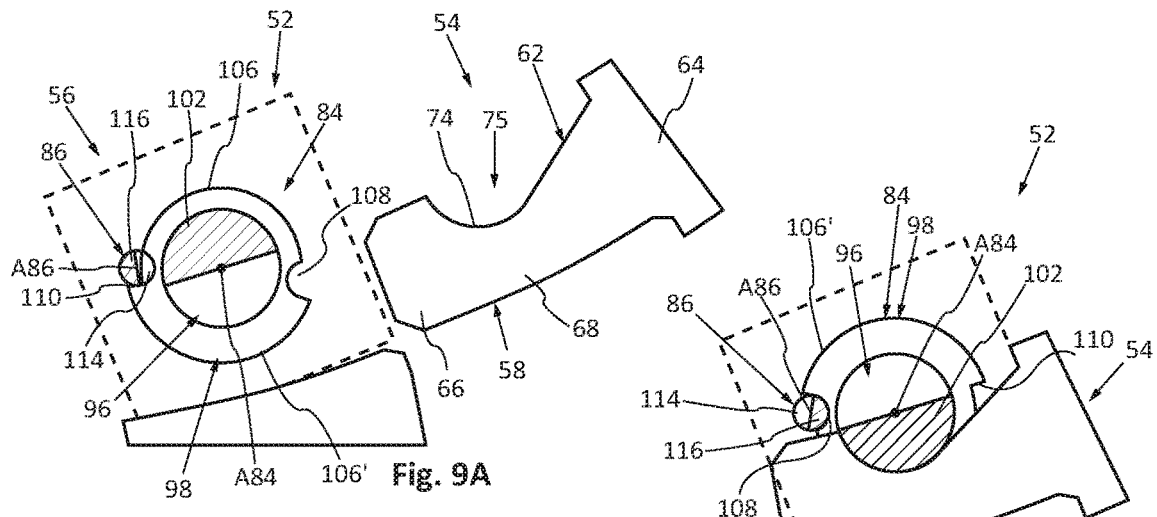
FIGS. 9A and 9B are diagrams in transverse planes of the locking device of FIG. 8 in the unhooked state and in the hooked and locked state.

According to an embodiment visible on FIGS. 9A and 9B, the flange 98 includes, at the periphery, a first cylindrical portion 106 and a second cylindrical portion 106', the second cylindrical portion 106' having a diameter greater than that of the first cylindrical portion 106. The first cylindrical portion 106 extends from the notch 108 up to a radial stop 110 and the second cylindrical portion 106' extends from the notch 108 up to the radial stop 110. The notch 108 and the radial stop 110 are approximately diametrically opposite.

Figure 13:
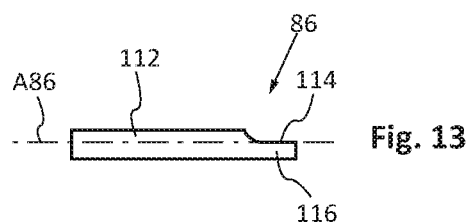
FIG. 13 is a perspective view of a second shaft of a locking device, which illustrates an embodiment of the invention.

According to an embodiment visible on FIG. 13, the second shaft 86 includes a cylindrical body 112 and a flat indent 114.

The flat indent 114 has a length greater than or equal to the thickness of the flange 98.

The flat indent 114 preferably has a depth P' (visible on FIG. 8) substantially equal to the radius of the body 112. At the flat indent 114, the body 112 therefore has a residual section 116 in the shape of a half disk.

The second shaft 86 is mounted to pivot in the second bores 94 made in the flanks 90.1 and 90.2 and alternately occupies, depending on its angular position, an unlocked position in which the flat indent 114 is oriented towards the first shaft 84 and a locked position in which the residual section 116 of the second shaft 86 is oriented towards the first shaft 84.

As illustrated on FIGS. 9A and 9B, the axis A86 of the second shaft 86 is separated from the axis A84 of the first shaft 84 by a distance equal to the radius of the first cylindrical portion 106 of the flange 98 of the first shaft 84 increased by a small functioning play.

Therefore, in the locked position, the residual section 116 of the second shaft 86 is accommodated and cooperates with the notch 108 in the flange 98 of the first shaft 84 so as to immobilize its rotation, and in the unlocked position, the residual section 116 of the second shaft 86 no longer cooperates with the notch 108 in the flange 98 of the first shaft 84 such that the latter can pivot from the hooked position to the unhooked position or vice-versa.

Advantageously, the axis A86 of the second shaft 86 is separated from the axis A84 of the first shaft 84 by a distance smaller than the radius of the second cylindrical portion 106' of the flange 98 of the first shaft 84. In the unhooked position, the residual section 116 of the second shaft 86 is therefore in contact with the radial stop 110 of the flange 98.

In order to ensure optimum functioning, at least one compressible shim 118 is interposed between the first and second parts of the locking device, as illustrated on FIG. 14.

The functioning principle of the locking device is described with reference to FIGS. 10A to 10E.

Figures 10A, 10B:
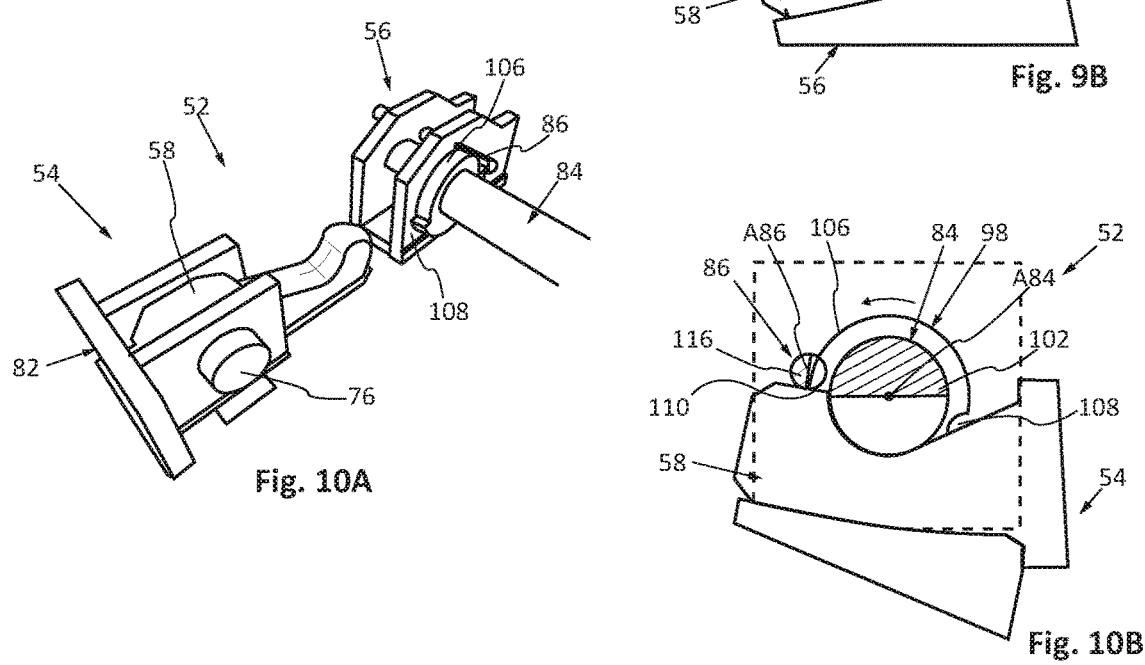
FIGS. 10A to 10E are perspective views or sectional views of a locking device, which illustrate its functioning.
Figures 10C, 10D:
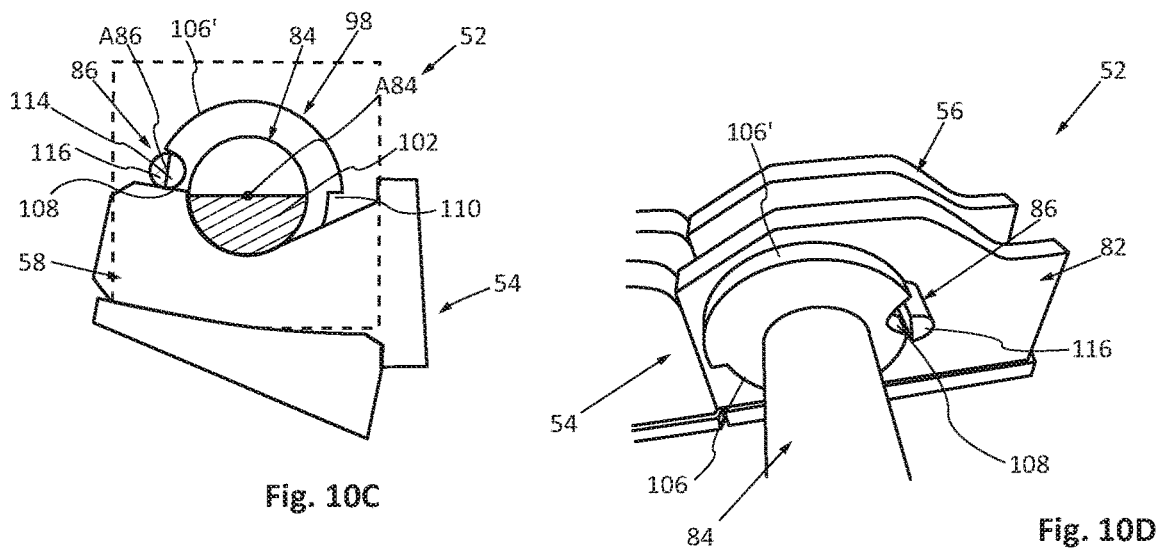

As illustrated on FIG. 10A, before the hook 58 is hooked, the second shaft 86 is placed in the unlocked position and the first shaft 84 is placed in the unhooked position.

The hook 58 is inserted between the base 88 of the clevis 82 and the first shaft 84 until the interposed portion 68 of the hook 58 is positioned between the base 88 of the clevis 82 and the first shaft 84 as illustrated on FIG. 10B.

After the first shaft 84 has pivoted to the hooked position, the hook 58 is in the hooked state and can no longer be unhooked. The hook 58 is not in the locked state since the second shaft 86 is not in the locked position, as illustrated on FIGS. 10C and 10D.

Figure 10E:
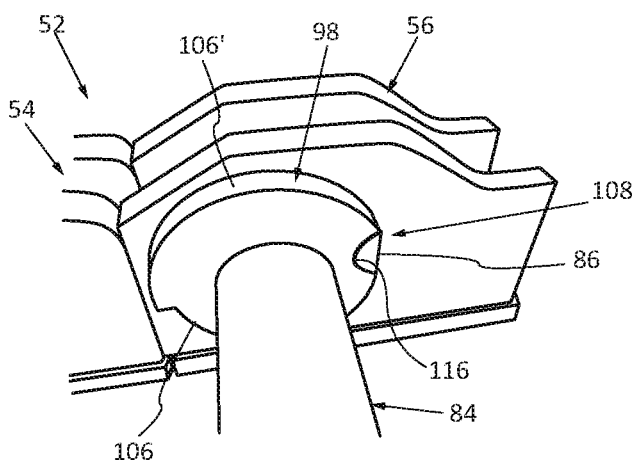

After the second shaft 86 has pivoted to the locked position as illustrated on FIG. 10E, the first shaft 84 can no longer pivot and the hook 58 is in the hooked and locked state.

In order to unlock the locking device, the second shaft 86 is made to rotate to the unlocked position. To follow, the first shaft 84 is made to rotate to the unhooked position. The hook 58 can then be disengaged from the first shaft 84.

In the presence of several locking devices, according to a first variant, each locking device includes a first shaft 84 and a second shaft 86, both independent respectively of the first shafts and the second shafts of the other locking devices. According to another variant, the first shaft 84 and/or the second shaft 86 are common to several locking devices as illustrated on FIG. 7.

The locking device also includes at least one actuator for modifying the angular position of the first shaft 84 and at least one actuator for modifying the angular position of the second shaft 86. According to one embodiment, the actuators and means of return motion are identical to those used to make the blocking and locking devices of the prior art pivot.

Whichever the variant, the first part 54 of the locking device includes a hook 58, which incorporates a housing 75. The second part 56 of the locking device includes a flange 98 with at least one notch 108 and a first shaft 84, which incorporates a section 102 configured for cooperating with the housing 75 of the hook 58. The first shaft 84 is furthermore rotationally mobile between a hooked position, in which the section 102 is accommodated in the housing 75 such that the first part 54 of the locking device is immobilized compared with the second part 56 of the locking device, and an unhooked position, in which the section 102 is outside the housing 75 such that the first part 54 of the locking device is mobile compared with the second part 56 of the locking device.

As a complement, the locking device includes a second shaft 86, which incorporates a section 116, which is configured for cooperating with the flange 98 of the first shaft 84, said second shaft 86 being rotationally mobile between a locked position, in which the section 116 of the second shaft 86 is accommodated in the notch 108 in the flange 98 of the first shaft 84 such that the rotation of the first shaft 84 is immobilized, and an unlocked position, in which the section 116 of the second shaft 86 is outside the notch 108 in the flange 98 of the first shaft 84 such that the first shaft 84 is free to rotate.

The invention makes it possible to obtain a locking device with a dual control based on pivoting elements (the first and second shafts), without links.

This design provides the following advantages:

simplification and reduced weight of the locking device due to the reduced number of parts, an assembly more compact and less sensitive to icing due to doing away with the links and using pivoting parts, reduced weight of the locking device when the hook has large dimensions due to the fact that the dual control formed by the first and second shafts is no longer connected to the hook as in the prior art, compatibility with the actuators of the locking devices of the prior art subject to minor adjustments.

Depending on the variant, the hook 58 can be fixed or mobile.

According to a first variant, not illustrated, the hook 58 is fixed in relation to the fuselage.

According to other variants, as illustrated on FIGS. 6, 10A to 10E and 14, the hook 58 is supported by a third shaft 76, which is accommodated in the bore 70 of the hook 58 and which includes an axis A76 oriented parallel to the longitudinal direction. The third shaft 76 is mounted on a clevis 78 integral with the second edge 46.2 of the opening 42.

During functioning, the hook 58 therefore pivots around the axis A76 of the third shaft 76. According to a first embodiment, the third shaft 76 has a diameter equal to that of the bore 70. In this case, the hook 58 can only pivot around the axis A76 of the third shaft 76.

According to a second embodiment visible on FIG. 14, the third shaft 76 has a diameter smaller than that of the bore 70 and a ring 80 with an eccentric bore is interposed between the third shaft 76 and the bore 70. This embodiment allows, in addition to the rotating motion around the axis A76 of the third shaft 76, a slight deflection of the third shaft 76, allowing the hook 58 to be automatically positioned in relation to the second part 56 of the locking device integral with the door 48.

The invention is naturally not limited to the embodiment described above. The hook 58 can consequently equally be connected to the door or to the fuselage. Likewise, the use of the locking device is not limited to locking a door. It can consequently be used to lock a first mobile element of an aircraft in relation to a second fixed element.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for locking a first mobile element of an aircraft in relation to a second fixed element, the locking device comprising:

a first part integral with one of the two elements, being the mobile element and the fixed element, and a second part integral with the other of the two elements, the first part including a hook with a housing, the second part comprising:

a first shaft, which incorporates a flange with a notch and a section configured for cooperating with the housing of the hook, the first shaft being rotationally mobile between a hooked position, in which the section is accommodated in the housing of the hook and an unhooked position in which the section is outside the housing of the hook, and a second shaft having a longitudinal axis parallel to a longitudinal axis of the first shaft, which incorporates a section configured for cooperating with the notch in the flange, said second shaft being rotationally mobile between a locked position, in which the section of the second shaft is accommodated in the notch in the flange of the first shaft such that the rotation of the first shaft is immobilized, and an unlocked position, in which the section of the second shaft is outside the notch in the flange of the first shaft such that the first shaft is free to rotate, wherein the flange includes, at the periphery, a first cylindrical portion and a second cylindrical portion, the second cylindrical portion having a diameter greater than that of the first cylindrical portion, the first cylindrical portion and the second cylindrical portion being separated by the notch and a radial stop, wherein the notch is separated from the radial stop by an arc segment of the second cylindrical portion and an arc segment of the first cylindrical portion.

2. The locking device according to claim 1, wherein the second part includes a clevis, which incorporates a base, and wherein the hook includes an extremity with a height smaller than the distance between the base of the clevis and the section of the first shaft when said first shaft is in the unhooked position, and greater than the distance between the base of the clevis and the section of the first shaft when said first shaft is in the hooked position.

3. The locking device according to claim 2, wherein the hook has a minimum height equal to the distance between the base and the section of the first shaft when said first shaft is in the hooked position.

4. The locking device according to claim 3, wherein the section of the first shaft is a half disc and wherein the hook includes a peripheral edge, which incorporates a profile with a radius equal to the radius of the section of the first shaft, said profile delimiting the housing of the hook.

5. The locking device according to claim 2, wherein the base of the clevis includes a side, which is oriented towards the first shaft and which includes at least one shim for adjusting the distance between the base and the section of the first shaft.

6. The locking device according to claim 1, wherein the notch and the radial stop are diametrically opposite.

7. The locking device according to claim 1, wherein the first part of the locking device includes a third shaft with an axis parallel to the axes of the first shaft and second shaft, said third shaft being accommodated in a bore of the hook such that said hook pivots around the axis of the third shaft.

8. The locking device according to claim 7, wherein the third shaft has a diameter smaller than the diameter of the bore of the hook and wherein the first part of the locking device includes a ring with an eccentric bore interposed between the third shaft and the bore of the hook.

9. An aircraft comprising:
an opening closed by a door, the opening and the door being equipped with a locking device comprising:
a first part integral with one of the opening or the door, and
a second part integral with the other of the opening or the door, the first part including a hook with a housing, the second part comprising:
a first shaft, which incorporates a flange with a notch and a section configured for cooperating with the housing of the hook, the first shaft being rotationally mobile between a hooked position, in which the section is accommodated in the housing of the hook and an unhooked position in which the section is outside the housing of the hook, and
a second shaft, which incorporates a section configured for cooperating with the notch in the flange, said second shaft being rotationally mobile between a locked position, in which the section of the second shaft is accommodated in the notch in the flange of the first shaft such that the rotation of the first shaft is immobilized, and an unlocked position, in which the section of the second shaft is outside the notch in the flange of the first shaft such that the first shaft is free to rotate,
wherein the flange includes, at the periphery, a first cylindrical portion and a second cylindrical portion, the second cylindrical portion having a diameter greater than that of the first cylindrical portion, the first cylindrical portion and the second cylindrical portion being separated by the notch and a radial stop,
wherein the notch is separated from the radial stop by an arc segment of the second cylindrical portion and an arc segment of the first cylindrical portion.

10. A device for locking a first mobile element of an aircraft in relation to a second fixed element, the device comprising:
a first part integral with one of the two elements, being the mobile element and the fixed element, and
a second part integral with the other of the two elements, the first part including a hook with a housing, the second part comprising:
a first shaft, which incorporates a flange with a notch and a section configured for cooperating with the housing of the hook, the first shaft being rotationally mobile between a hooked position, in which the section is accommodated in the housing of the hook and an unhooked position in which the section is outside the housing of the hook, and
a second shaft having a longitudinal axis parallel to a longitudinal axis of the first shaft, which incorporates a section configured for cooperating with the notch in the flange, said second shaft being rotationally mobile between a locked position, in which the section of the second shaft is accommodated in the notch in the flange of the first shaft such that the rotation of the first shaft is immobilized, and an unlocked position, in which the section of the second shaft is outside the notch in the flange of the first shaft such that the first shaft is free to rotate,
wherein the flange includes, at the periphery, a first cylindrical portion and a second cylindrical portion, the second cylindrical portion having a diameter greater than that of the first cylindrical portion, the first cylindrical portion and the second cylindrical portion being separated by the notch and a radial stop,
wherein the notch and the radial stop are diametrically opposite.

* * * * *